(12) United States Patent
Cheng et al.

(10) Patent No.: US 10,192,573 B2
(45) Date of Patent: Jan. 29, 2019

(54) DEVICES INCLUDING METAL LAYER

(71) Applicant: SEAGATE TECHNOLOGY LLC, Cupertino, CA (US)

(72) Inventors: Yuhang Cheng, Edina, MN (US); Ed F. Rejda, Bloomington, MN (US); Andrew J. Boyne, Minneapolis, MN (US); Kurt W. Wierman, Eden Prairie, MN (US); Michael Seigler, Eden Prairie, MN (US); Scott Franzen, Savage, MN (US); Jie Gong, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/073,433

(22) Filed: Mar. 17, 2016

(65) Prior Publication Data
US 2016/0275969 A1 Sep. 22, 2016

Related U.S. Application Data

(60) Provisional application No. 62/136,546, filed on Mar. 22, 2015.

(51) Int. Cl.
| | |
|---|---|
| *G11B 5/187* | (2006.01) |
| *G11B 5/31* | (2006.01) |
| *G11B 5/127* | (2006.01) |
| *G11B 5/39* | (2006.01) |
| *G11B 5/00* | (2006.01) |

(Continued)

(52) U.S. Cl.
CPC .............. *G11B 5/314* (2013.01); *G11B 5/127* (2013.01); *G11B 5/1278* (2013.01); *G11B 5/187* (2013.01); *G11B 5/3106* (2013.01); *G11B 5/3133* (2013.01); *G11B 5/3967* (2013.01); *G11B 5/012* (2013.01); *G11B 5/3136* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,492,873 | A | 1/1985 | Dmitriv |
| 5,482,611 | A | 1/1996 | Helmer |
| 5,849,093 | A | 12/1998 | Andra |

(Continued)

FOREIGN PATENT DOCUMENTS

| | | |
|---|---|---|
| EP | 240088 | 10/1987 |
| EP | 0942072 | 9/1999 |

(Continued)

OTHER PUBLICATIONS

Al-Bayati et al., Junction Profiles of Sub keV Ion Implantation for Deep Sub-Quarter Micron Devices, IEEE, 2000, pp. 87-90.

(Continued)

*Primary Examiner* — Brian Butcher
(74) *Attorney, Agent, or Firm* — Mueting, Raasch & Gebhardt, P.A.

(57) ABSTRACT

Devices having an air bearing surface (ABS), the devices include a write pole; a near field transducer (NFT) including a peg and a disc, wherein the peg is at the ABS of the device; an overcoat, the overcoat including a low surface energy layer.

7 Claims, 5 Drawing Sheets

(51) Int. Cl.
  *G11B 5/012* (2006.01)
  *G11B 5/60* (2006.01)

(56) References Cited

U.S. PATENT DOCUMENTS

| | | | |
|---|---|---|---|
| 5,945,681 A | 8/1999 | Tokiguchi | |
| 6,130,436 A | 10/2000 | Renau | |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,839,191 B2 | 1/2005 | Sugiura | |
| 7,377,228 B2 | 5/2008 | MacK | |
| 7,476,855 B2 | 1/2009 | Huang | |
| 8,077,559 B1 | 12/2011 | Miyauchi | |
| 8,325,567 B2 | 12/2012 | Miyauchi | |
| 8,351,151 B2 | 1/2013 | Katine | |
| 8,351,307 B1 | 1/2013 | Wolf | |
| 2005/0012052 A1 | 1/2005 | Platzgummer | |
| 2006/0238133 A1 | 10/2006 | Horsky | |
| 2008/0230724 A1 | 9/2008 | Low | |
| 2010/0061199 A1 | 3/2010 | Hirara | |
| 2010/0123965 A1 | 5/2010 | Lee | |
| 2010/0123967 A1 | 5/2010 | Batra | |
| 2010/0190036 A1 | 7/2010 | Komvopoulos | |
| 2010/0320403 A1 | 12/2010 | Amaldi | |
| 2011/0006214 A1 | 1/2011 | Bonig | |
| 2011/0026161 A1 | 2/2011 | Ikeda | |
| 2011/0205863 A1 | 8/2011 | Zhao | |
| 2011/0294398 A1 | 12/2011 | Hu | |
| 2011/0317528 A1 | 12/2011 | Miyauchi | |
| 2012/0045662 A1 | 2/2012 | Zou | |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0330573 A1 | 12/2013 | Zhao | |
| 2014/0113160 A1 | 4/2014 | Pitcher | |
| 2014/0204723 A1 | 7/2014 | Shimazawa | |
| 2014/0269237 A1 | 9/2014 | Sasaki | |
| 2015/0170675 A1* | 6/2015 | Shimazawa | G11B 5/314 369/13.33 |
| 2015/0206545 A1* | 7/2015 | Balamane | G11B 5/314 369/13.33 |

FOREIGN PATENT DOCUMENTS

| | | |
|---|---|---|
| EP | 1328027 | 7/2003 |
| EP | 2106678 | 10/2008 |
| WO | WO 97/45834 | 12/1997 |

OTHER PUBLICATIONS

Angel et al., "Enhanced Low Energy Drift-Mode Beam Currents in a High Current Ion Implanter," IEEE, 1999, pp. 219-222.

Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.

Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.

Piazza et al., "Large Area Deposition of Hydrogenated Amorphous Carbon Films for Optical Storage Disks", Diamond and Related Materials, vol. 13, No. 4-8, Apr. 2004, pp. 1505-1510.

Robertson, J., "Diamond-Like Amorphous Carbon," Materials Science and Engineering R 37, 2002, pp. 129-281.

PCT/2013/030659 Search Report and Written Opinion dated Jun. 17, 2013.

PCT/US2013/024273 Search Report and Written Opinion dated Apr. 2, 2013.

PCT/US2013/024274 Search Report and Written Opinion dated Apr. 2, 2013.

* cited by examiner

DEVICES INCLUDING METAL LAYER

PRIORITY

This application claims priority to U.S. Provisional Application No. 62/136,546 entitled NEAR FIELD TRANSDUCERS (NFTS) AND ADJACENT STRUCTURES FOR HEAT ASSISTED MAGNETIC RECORDING filed on Mar. 22, 2015 the disclosure of which is incorporated herein by reference thereto.

SUMMARY

Disclosed are devices having an air bearing surface (ABS), the device including a write pole; a near field transducer (NFT) including a peg and a disc, wherein the peg is at the ABS of the device; a metallic layer positioned over at least the peg of the NFT at the ABS, the metallic layer including iridium (Ir), rhodium (Rh), ruthenium (Ru), radium (Ra), platinum (Pt), palladium (Pd), rhenium (Re), chromium (Cr), niobium (Nb), nickel (Ni), lead (Pb), silicon (Si), tin (Sn), aluminum (Al), tungsten (W), molybdenum (Mo), hafnium (Hf), titanium (Ti), zirconium (Zr), yttrium (Y), or combinations thereof; and an overcoat positioned over at least the metallic layer.

Also disclosed are devices having an air bearing surface (ABS), the devices including a write pole; a near field transducer (NFT) including a peg and a disc, wherein the peg is at the ABS of the device; a metallic layer positioned over at least the peg of the NFT at the ABS, the metallic layer including: iridium (Ir), chromium (Cr), tin (Sn), platinum (Pt), or combinations thereof; and an overcoat positioned over at least the metallic layer.

Also disclosed are devices having an air bearing surface (ABS), the devices including a write pole; a near field transducer (NFT) including a peg and a disc, wherein the peg is at the ABS of the device; a metallic layer positioned over at least the peg of the NFT at the ABS and the write pole, the metallic layer including: iridium (Ir), rhodium (Rh), ruthenium (Ru), radium (Ra), platinum (Pt), palladium (Pd), rhenium (Re), chromium (Cr), niobium (Nb), nickel (Ni), lead (Pb), silicon (Si), tin (Sn), aluminum (Al), tungsten (W), molybdenum (Mo), hafnium (Hf), titanium (Ti), zirconium (Zr), yttrium (Y), or combinations thereof; and an overcoat positioned over at least the metallic layer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

In some embodiments, a NFT can include a small peg and a large disk. The very high temperatures that the NFT reaches during operation can lead to diffusion of the material of the NFT (for example gold) from the peg and towards the disk. This can lead to deformation and recession of the peg, which can lead to failure of the NFT and the entire head.

Adhesion between the peg and the head overcoat may play an important role in deformation and recession of the peg. In previously utilized devices, the ends surface of the peg is in direct contact with the head overcoat, for example an oxide in the head overcoat. Typically materials of the peg, e.g., gold, will not adhere well to an oxide. This may create defects at the interface of the gold/oxide interface. These defects then promote diffusion of the gold atoms at the high operating temperatures. Devices disclosed herein include a metallic layer between the peg and the head overcoat to promote adhesion between the peg and the head overcoat and increase overall head reliability.

Disclosed devices include one or more layers adjacent one or more surfaces of the peg of the NFT to increase or improve adhesion of the peg material to the surrounding materials or structures within the device. If the peg is better adhered to the surrounding materials or structures, it will be less likely to deform and/or recess.

Figure 1:
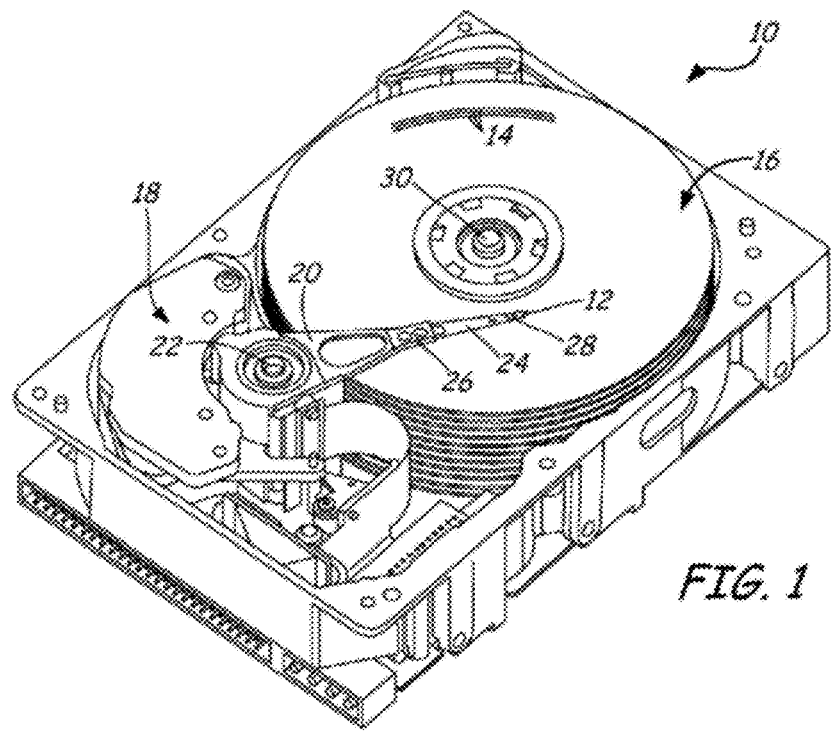
FIG. 1 is a perspective view of a magnetic disc drive that can include HAMR devices.

FIG. 1 is a perspective view of disc drive 10 including an actuation system for positioning slider 12 over track 14 of magnetic medium 16. The system depicted in FIGS. 1 and 2 can include disclosed structures and multilayer gas barrier layers. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
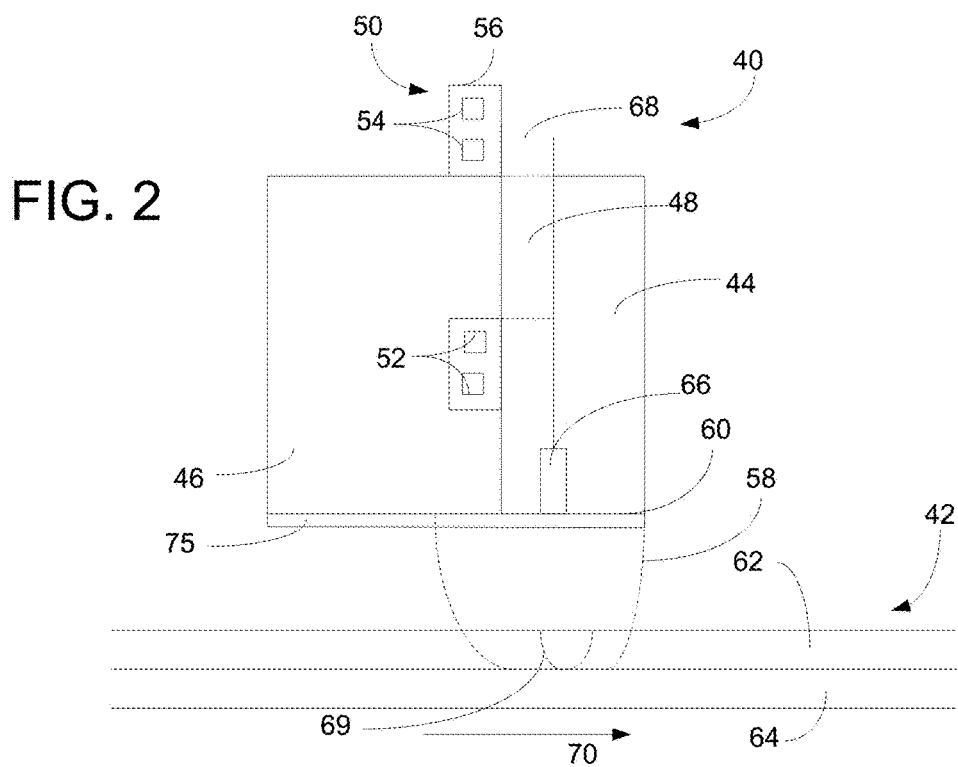
FIG. 2 is a cross sectional view of a HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer (NFT) 66 is positioned adjacent the write pole 44 proximate air bearing surface 60. Positioned over the NFT 66 and optionally over other features in the HAMR magnetic device 40 is an overcoat layer 75. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIGS. 1 and 2.

Figure 3A:
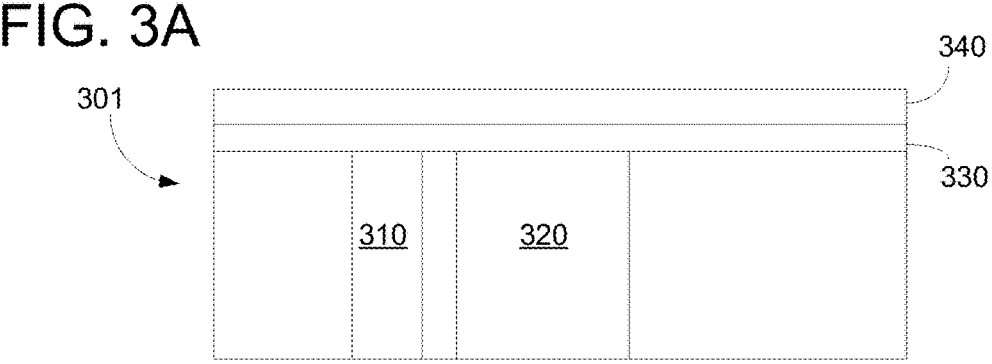
FIGS. 3A, 3B, 3C, 3D and 3E are cross sections of portions of disclosed devices with metallic layers over substantially the entire surface (FIG. 3A); the peg and the area surrounding the peg (FIG. 3B); the peg, the write pole and the area surrounding both (FIG. 3C); only the peg and the write pole (FIG. 3D); and only the peg (FIG. 3E).

FIG. 3A depicts an illustrative embodiment of at least a portion of a disclosed device. The device 301 can include at least a peg 310 of an NFT and a write pole 320. The peg 310 and the write pole 320 are separated by an oxide material. The device 301 also includes a metallic layer 330 and overcoat layer 340. The metallic layer 330 is generally positioned between the overcoat layer 340 and at least the peg 310. In the embodiment depicted in FIG. 3A metallic layer 330 is positioned over more than just the peg 310; it is positioned over the peg 310, the write pole 320, and at least some of the oxide material of the device. It is thought but not relied upon that the metallic layer 330 may function to improve adhesion between at least the peg 310 and the overcoat layer 340. Improved adhesion may thereby lead to improved thermal stability of the peg and reliability of the overall device.

In some embodiments, metallic layer 330 can generally include a metallic material or a metal that has a relatively low solubility in the material of the peg. The lower the solubility of the material of the metallic layer 330, the less likely it will be that it will be dissolved into the material of the peg. In some embodiments, the NFT, or more specifically, the peg, a disc, a heat sink or any combination thereof can be made of a plasmonic material. Illustrative NFT materials can include plasmonic materials such as gold (Au), silver (Ag), aluminum (Al), copper (Cu), ruthenium (Ru), rhodium (Rh), iridium (Ir), or alloys thereof; titanium nitride (TiN), zirconium nitride (ZrN), or combinations thereof; thermally conductive oxides; indium tin oxide (ITO); and combinations thereof. In some embodiments, illustrative NFT materials can also include those disclosed in U.S. Patent Publication No. 2013/0286799; and U.S. Pat. Nos. 8,830,800, 8,427,925 and 8,934,198; the disclosures of which are incorporated herein by reference thereto. In some embodiments the peg can include gold.

In some embodiments, metallic layer 330 can generally include a metallic material or a metal that is relatively resistant to oxidation, resistant to corrosion, or some combination thereof. This property of a metallic layer 330 may be important because during writing, the head overcoat over the peg is exposed to a relatively harsh environment including high pressures, high temperatures, high moisture content, high oxygen content, acidity, or any combination thereof. A metallic layer that is at least somewhat resistance to oxidation/corrosion may contribute to the stability of the peg by having such properties. In some embodiments the material of the metallic layer 330 has both a relatively high resistance to oxidation and a relatively high resistance to corrosion.

In some embodiments, metallic layer 330 can generally include a metallic material or a metal that has a relatively high melting point. This property of a metallic layer 330 may be important because a metallic layer having such a property may be more likely to maintain their shape, stability and integrity at high operating temperatures. In some embodiments the material of the metallic layer 330 has a relatively high melting point. In some embodiments, the material of the metallic layer may have a melting point of not less than 1000° C., not less than 1100° C., or even not less than 1500° C.

In some embodiments, metallic layer 330 can generally include a metallic material or a metal that have relatively good optical properties. Alloys of metals that have exceptional optical properties typically have better optical properties than other metallic materials and may advantageously have higher melting points than the pure metal with the exceptional optical properties. For example alloys of gold, which has exceptional optical properties, will have higher melting points than pure gold and better optical properties than other metallic materials.

In some embodiments, metallic layer 330 can generally include one or more metal atoms. In some embodiments the metallic layer 330 can generally include one or more of iridium (Ir), rhodium (Rh), ruthenium (Ru), radium (Ra), platinum (Pt), palladium (Pd), rhenium (Re), chromium (Cr), niobium (Nb), nickel (Ni), lead (Pb), silicon (Si), tin (Sn), aluminum (Al), tungsten (W), molybdenum (Mo), hafnium (Hf), titanium (Ti), zirconium (Zr), yttrium (Y), or combinations thereof. In embodiments where the melting point of the material of the metallic layer 330 is being considered, the metallic layer 330 can include platinum (Pt), palladium (Pd), ruthenium (Ru), iridium (Ir), rhodium (Rh), rhenium (Re), chromium (Cr), niobium (Nb), nickel (Ni), lead (Pb), silicon (Si), tin (Sn), aluminum (Al), tungsten (W), molybdenum (Mo), hafnium (Hf), titanium (Ti), zirconium (Zr), yttrium (Y), or combinations thereof. In some embodiments the metallic layer 330 can include palladium (Pd), rhenium (Re), chromium (Cr), lead (Pb), silicon (Si), tin (Sn), tungsten (W), molybdenum (Mo), titanium (Ti), zirconium (Zr), yttrium (Y), or combinations thereof. In some embodiments the metallic layer 330 can include iridium (Ir), rhodium (Rh), ruthenium (Ru), radium (Ra), or combinations thereof. In embodiments where the oxidation/corrosion resistance of the material of the metallic layer 330 is being considered the metallic layer 330 can include platinum (Pt), palladium (Pd), ruthenium (Ru), iridium (Ir), rhodium (Rh), rhenium (Re), chromium (Cr), niobium (Nb), nickel (Ni), lead (Pb), silicon (Si), tin (Sn), aluminum (Al), tungsten (W), molybdenum (Mo), hafnium (Hf), titanium (Ti), zirconium (Zr), yttrium (Y), or combinations thereof. In some embodiments the metallic layer 330 can include palladium (Pd), ruthenium (Ru), iridium (Ir), rhodium (Rh), rhenium (Re), lead (Pb), silicon (Si), tin (Sn), tungsten (W), molybdenum (Mo), titanium (Ti), zirconium (Zr), yttrium (Y), or combinations thereof. In some embodiments the metallic layer 330 can include a gold alloy such as AuCu, for example. In some embodiments the metallic layer 330 can include NiCr, NiAl, or combinations thereof. In some embodiments the metallic layer 330 can include platinum (Pt), palladium (Pd), ruthenium (Ru), iridium (Ir), rhodium (Rh), rhenium (Re), chromium (Cr), niobium (Nb), nickel (Ni), lead (Pb), silicon (Si), tin (Sn), aluminum (Al), hafnium (Hf), or combinations thereof. In some embodiments the metallic layer 330 can include NiCr, NiAl, AuCu, or combinations thereof. In some embodiments the metallic layer 330 can include iridium (Ir), chromium (Cr), tin (Sn), platinum (Pt), or combinations thereof. In some embodiments the metallic layer 330 can include iridium (Ir).

In some embodiments metallic layer 330 can include an alloy of a metal that has exceptional optical properties. For example the metallic layer 330 could include an alloy of a metal that has plasmon properties. For example the metallic layer 330 could include an alloy of the metal of which the peg was formed. In a specific illustrative embodiment, some metallic layers 330 can include an alloy of gold and one or more of platinum (Pt), palladium (Pd), ruthenium (Ru), iridium (Ir), rhodium (Rh), rhenium (Re), chromium (Cr), nickel (Ni), lead (Pb), silicon (Si), tin (Sn), aluminum (Al), hafnium (Hf), copper (Cu), yttrium (Y), or combinations thereof. In some embodiments metallic layer 330 can include an alloy of gold and one or more of palladium (Pd), ruthenium (Ru), iridium (Ir), rhodium (Rh), rhenium (Re), lead (Pb), silicon (Si), tin (Sn), yttrium (Y), or combinations thereof.

The metallic layer 330 can be characterized by its thickness. In some embodiments the metallic layer 330 can have an average thickness of not less than 0.1 nm, not less than 0.2 nm or not less than 0.5 nm. In some embodiments the metallic layer 330 can have an average thickness of not greater than 50 nm, not greater than 25 nm, not greater than 15 nm, or even not greater than 5 nm. In some embodiments the impact of the metallic layer 330 on the optical performance of the device can be at least reduced by having a relatively thin metallic layer 330. In some embodiments therefore the metallic layer 330 can have a thickness from 0.2 nm to 5 nm, for example.

The metallic layer can be deposited using any known methods. Examples of illustrative useful deposition methods can include, vapor deposition techniques such as chemical vapor deposition (CVD), physical vapor deposition (PVD), magnetron sputtering, cathodic arc deposition, plasma enhanced chemical vapor deposition (PECVD) and laser ablation. The metallic layer can also be chemically deposited.

Figure 3B:
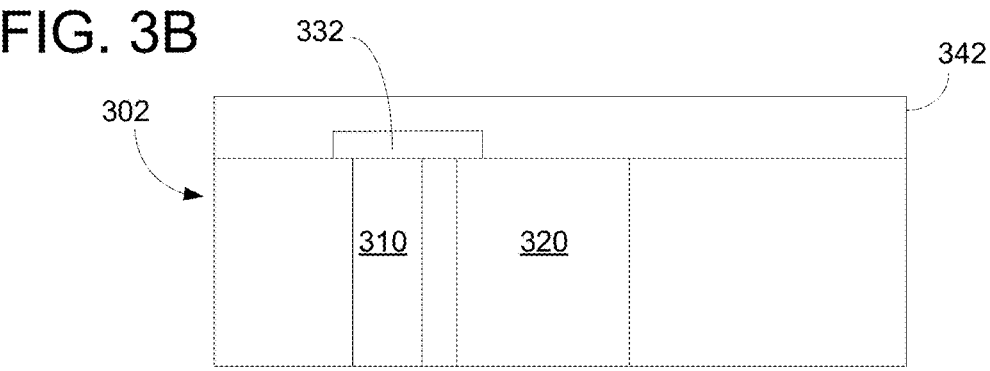

FIG. 3B shows an illustrative device 302 that includes a peg 310, a write pole 320, a metallic layer 332, and an overcoat layer 342. In the embodiment depicted in FIG. 3A the metallic layer 330 if in contact with a magnetic reader (not shown) could electrically short the magnetic reader. In contrast, the metallic layer 332 in device 302 can be described as positioned only over the area surrounding the peg 310. The metallic layer 332 can also be described as not positioned over a magnetic reader. Such a configuration could serve to prevent or minimize electrical shunting of the reader. Various process and deposition methods could be utilized to form such a device.

Figure 3C:
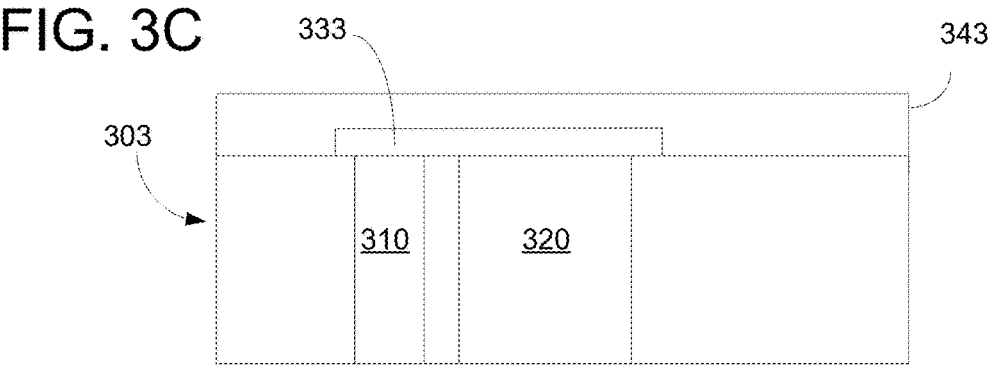

FIG. 3C shows an illustrative device 303 that includes a peg 310, write pole 320, a metallic layer 333, and an overcoat layer 343. In contrast to the embodiment depicted in FIG. 3B, the metallic layer 333 in device 303 covers both the peg 310 and the write pole 320. Such an embodiment may be advantageous to improve stability, reliability or both of the write pole. For example addition of the metallic layer 333 over the write pole could improve the corrosion resistance of the write pole. This embodiment could offer a device that has a relatively highly thermal stable peg and a relatively highly corrosion resistant write pole. Embodiments such as device 303 could be formed using various process and deposition methods. A specific illustrative process for making a device such as device 303 could include use of photo lithography, sputtering, ion beam deposition (IBD), electroplating, or any combination thereof. In some embodiments the metallic layer 333 could be deposited using photo lithography followed by sputtering, IBD, electroplating or any combination thereof.

Figure 3D:
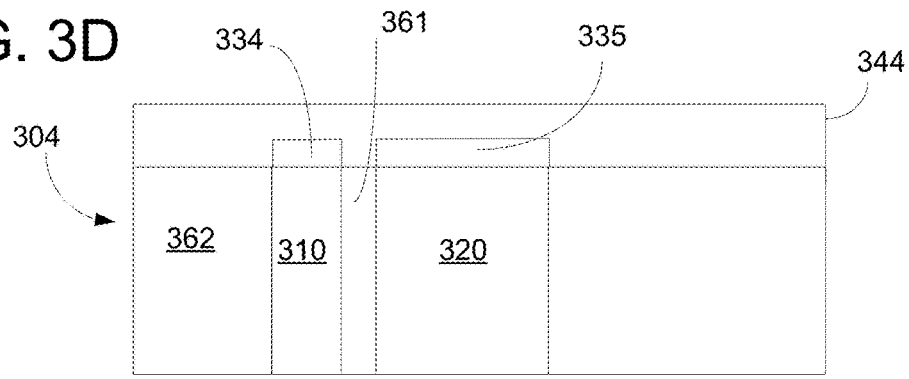

FIG. 3D shows an illustrative device 304 that includes a peg 310 and a write pole 320. The peg 310 and the write pole 320 are separated by an oxide material that can be referred to as the pole to NFT space or "PNS" 361. The oxide material on the adjacent side of the peg 310 can be referred to as the core to NFT space "CNS" 362. This embodiment includes two portions of a metallic layer that are not connected. Specifically, a peg metallic layer 334 and a pole metallic layer 335 are included in this device. The metallic layer does not extend between the two portions. Similarly the metallic layer does not cover the NPS 361. Such an embodiment could offer an advantage because it separates the peg and the pole from each other to reduce their optical interaction, protect the pole surface from oxidation, or combinations thereof. Embodiments such as device 304 could be formed using various process and deposition methods. A specific illustrative process for making a device such as device 304 could include depositing the material of the metallic layer on the surface of the peg using an electrochemical method, for example, after lapping of the bar. Once this is done, the peg, the write pole, and the shields (not shown herein) will be electrically connected to a power supply. The metallic layer can then be deposited over the write pole only by electroplating. In some embodiments the metallic layer could also be deposited over the write pole and the shield surfaces only by electroplating. In some embodiments the metallic layer could also be deposited over the write pole, the shield surfaces and the peg only by electroplating.

Figure 3E:
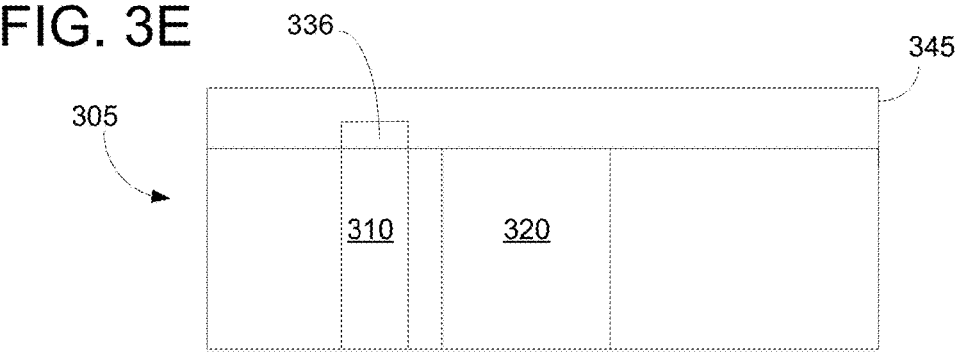

FIG. 3E shows an illustrative device 305 that includes a peg 310, a write pole 320, a metallic layer 336 and an overcoat layer 345. The metallic layer 336 in this illustrative embodiment is positioned only over the peg 310. Such an embodiment could offer an advantage because the magnetic field from the pole won't be affected by the addition of the metallic layer. Embodiments such as device 305 could be formed using various process and deposition methods.

In some embodiments an optional separate adhesion layer could also be included in a disclosed device. Such an optional adhesion layer may be advantageous to further improve the adhesion of the metallic layer to the head overcoat. The optional adhesion layer can be described as being positioned between the metallic layer and the adjacent overcoat layer.

Figure 4A:
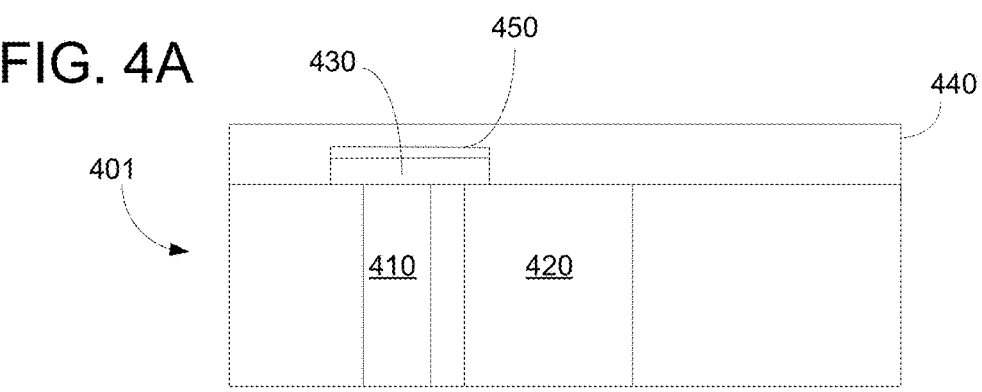
FIGS. 4A and 4B are cross sections of portions of disclosed devices with metallic layers and optional adhesion layers between the metallic layer and the overcoat (FIG. 4A) and surrounding the peg (FIG. 4B).

FIG. 4A shows an illustrative device 401 that includes a peg 410, write pole 420, a metallic layer 430, and overcoat layer 440 and an adhesion layer 450. As seen from FIG. 4A, the adhesion layer 450 is positioned between the metallic layer 430 and the overlying overcoat layer 440. It should also be noted that the adhesion layer 450 could optionally be extended down to cover the ends or sides of the metallic layer 430. The adhesion layer 450 can include a metallic material or a metal, for example. In some embodiments the material of the adhesion layer 450 can have a relatively high adhesion to the overcoat layer material. In some embodiments where the overcoat layer includes an oxide, the adhesion layer can include silicon (Si), chromium (Cr), titanium (Ti), tantalum (Ta), zirconium (Zr), niobium (Nb), neodymium (Nd), hafnium (Hf), nickel (Ni), or combinations thereof. In some embodiments the adhesion layer may have an average thickness of not less 0.1 nm or not less than 0.3 nm. In some embodiments the adhesion layer may have an average thickness of not greater than 10 nm, or not greater than 5 nm.

Figure 4B:
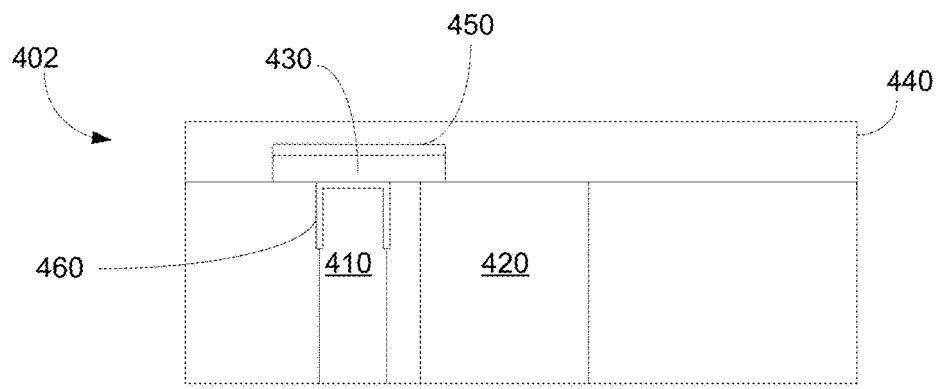
Figure 5A:
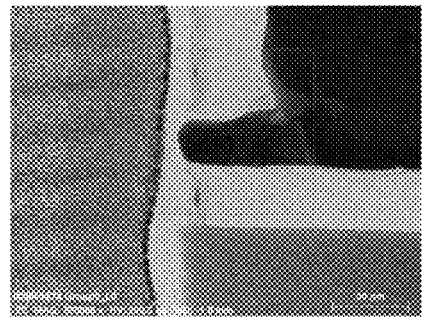
FIG. 5A to 5D show scanning electron microscope (SEM) (FIGS. 5A and 5C) and cross-sectional transmission electron microscopy/energy dispersive x-ray spectroscopy (TEM/EDX) (FIGS. 5B and 5D) results of the head including only chromium (FIGS. 5A and 5B) and the head including chromium and iridium (FIGS. 5C and 5D) after annealing at 48 hours.
Figure 5B:
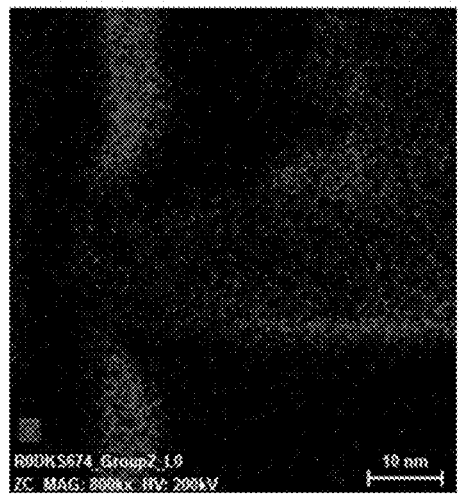
Figure 5C:
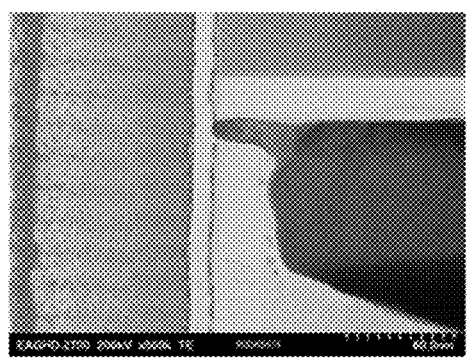
Figure 5D:
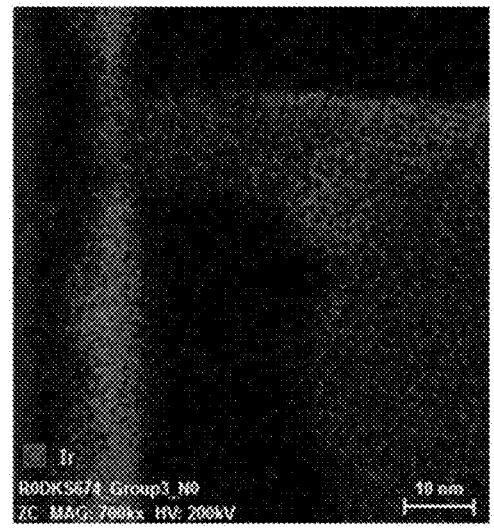

FIG. 4B shows an illustrative device 402 that includes a peg 410, a write pole 420, a metallic layer 430, and overcoat layer 440. This device also includes an optional adhesion layer 450 similar to that discussed with respect to FIG. 4A and a peg adhesion layer 460. An embodiment such as device 402 may be advantageous because the adhesion layer 450 increases adhesion of the metallic layer 430 to the overcoat layer 440 and increases adhesion of the peg 410 to the metallic layer 430. In some embodiments a diffusion process could be used to diffuse part of the material of the peg adhesion layer 460 into the peg 410 and the peg/dielectric interface to further improve the thermal stability of the peg.

In additional embodiments, an optional adhesion layer could be added between the metallic layer and the peg to improve adhesion of the metallic layer to the peg material. The adhesion layer could be a material with good adhesion to both the metallic layer and the peg material. In some embodiments, the adhesion layer can be an alloy containing elements from both the metallic layer and the peg.

As discussed above various methods and processes can be utilized to form devices disclosed herein. From a process standpoint it can be difficult to deposit a metallic layer having a thickness of not greater than 30 nm. In some embodiments a thicker metallic layer can be deposited in desired locations (e.g. the peg surface) and then an etching process for example plasma etching, could be utilized to reduce the thickness of the metallic layer to the desired thickness. Once the metallic layer has been reduced sufficiently, the overcoat layer can be deposited using known methods.

Another illustrative method of forming devices disclosed herein can include materials and a structure that electrically isolates the peg from the write pole. This can be accomplished by using a material having a relatively high thermal conductivity and relatively high electrical resistance. Illustrative materials could include for example aluminum nitride (AlN), boron nitride (BN), or combinations thereof. The NFT is then electrically connected to a power supply and a metallic layer can be deposited on only the peg surface.

Another illustrative method of forming devices disclosed herein can include electrochemical deposition processes. In some embodiments the electrochemical deposition process can be controlled so that a relatively thick metallic layer is deposited over a portion of the surface, more than simply the peg surface. After formation of the thick metallic layer, the material can be etched, for example plasma etched, to remove the metallic layer material over areas where it is not desired but maintain the metallic layer over the peg. In some specific embodiments the thick metallic layer can be deposited over both the peg and the write pole, and the etching step can remove it from the write pole.

Another illustrative method of forming devices disclosed herein can include electric atomic layer plating deposition processes or vacuum atomic layer deposition processes. These processes can be used to deposit a relatively thin metallic layer over the peg. Once deposited the overcoat layer material can be deposited over the entire ABS surface to form the overcoat layer. Utilizing processes such as these, an etching step may not be necessary.

Some illustrative methods of forming devices disclosed herein that utilize sputtering may deposit a metallic layer over the core/CNS/NPS which would not necessarily be desirable. In such cases, overlying diamond like carbon (DLC) could be utilized as a mask. Specifically the NFT could be coupled to a laser, and the energy transmitted out of the peg would selectively remove the DLC overlying the peg. Once this portion of the DLC is removed, a metallic layer could be sputtered over only the peg. After that, a lift off process, such as oxygen plasma treatment could remove the carbon layer together with the metal layer over it. Subsequently, regular HOC could be deposited on the top.

Some illustrative methods of forming devices disclosed herein may utilize sputtering followed by etching. In such cases the shadowing effect may not be sufficient to maintain the metallic layer over the peg. Processes or methods of controlling this effect may be desirable in some methods. Some illustrative methods of forming devices disclosed herein may utilize sputtering followed by lapping. In such cases it may be somewhat difficult to control the thickness of the final metal layer. Processes and methods of controlling this effect may be desirable in some methods. Some illustrative methods of forming devices disclosed herein may utilize electroplating. In such cases it may be somewhat difficult to control the thickness of the final metal layer to a thickness of less than 5 nm. Processes and methods of controlling this may therefore be desirable in some methods. One way in which this could be addressed would be to follow the electroplating with an etching step, for example plasma etching. This would allow the electroplating step to deposit a thicker than necessary layer that could ultimately be removed by the etching.

Disclosed devices could also optionally be combined with disclosed devices or portions of devices disclosed in commonly owned U.S. patent application Ser. No. 15/073,445, filed on the same day herewith entitled DEVICES INCLUDING METAL LAYER, claiming priority to U.S. Provisional Patent Application No. 62/136,546; the disclosure of which is incorporated herein by reference thereto.

EXAMPLES

Example 1

The impact of a metallic layer and an optional adhesion layer on the thermal stability of a peg was investigated as follows. A 25 Å thick iridium (Ir) layer was deposited on the ABS surface of a bar so that the iridium layer was in direct contact with the peg. A 20 Å thick chromium (Cr) layer was deposited between the iridium layer and a diamond like carbon (DLC) overcoat. The head was then thermally annealed at 400° C. for various times (seen in Table 1). Two bars from the same wafer, one with a 50 Å tantalum oxide (TaO) overcoat and a second with only 20 Å chromium (Cr) and 20 Å DLC deposited thereon were compared. Table 1 shows the percent of the three heads that failed after being annealed at various conditions.

TABLE 1

|  | 20 min | 1 hr | 3 hrs | 6 hrs | 12 hrs | 24 hrs | 48 hrs |
| --- | --- | --- | --- | --- | --- | --- | --- |
| 50 Å TaO | 100 |  |  |  |  |  |  |
| 20 Å Cr/20 Å DLC |  | 0 | 0 | 1.92 | 12.73 | 28.30 | 41.82 |
| 25 Å Ir/20 Å Cr/20 Å DLC |  | 0 | 0 | 0 | 0 | 1.82 | 9.09 |

As seen from Table 1, the heads without a metallic layer show 100% peg recession after being annealed at 400° C. for 20 minutes. As compared with the head without the metallic layer, the lifetime of the head with only a chromium layer and the head with a chromium and iridium layer increased by at least 144 times. The failure rate of the head with the iridium layer showed significantly lower recession rate.

FIG. 5A to 5D show scanning electron microscope (SEM) (FIGS. 5A and 5C) and cross-sectional transmission electron microscopy/energy dispersive x-ray spectroscopy (TEM/EDX) (FIGS. 5B and 5D) results of the head including only chromium (FIGS. 5A and 5B) and the head including chromium and iridium (FIGS. 5C and 5D) after annealing at 48 hours. As seen there, the head with the chromium on top of the peg diffuses into the peg dielectric interface. On the other hand, the iridium layer remains intact in front of the peg. This may contribute to a relatively higher than normal thermal stability of a peg having a structure formed thereon.

Example 2

Different metallic layers as seen in table 2 were deposited on the ABS of heads. The metallic layers were then covered by an overcoat layer of DLC. Isothermal stress in vacuum (annealing at 300° C. or 400° C. for various times) was used to test the thermal stability of the pegs.

TABLE 2

|  | 3 hrs at 300° C. | 20 min | 1 hr | 3 hrs | 6 hrs | 12 hrs | 24 hrs | 48 hrs |
| --- | --- | --- | --- | --- | --- | --- | --- | --- |
| 50 Å TaO | 98.6 |  |  |  |  |  |  |  |
| 50 Å TaO |  | 100 |  |  |  |  |  |  |
| 50 Å TaO |  |  | 100 |  |  |  |  |  |
| 30 Å Al/20 Å Cr/20 Å DLC |  |  | 87.27 | 86.79 |  |  |  |  |
| 25 Å Sn/20 Å Cr/20 Å DLC |  |  | 0 | 0 | 0 | 14.29 | 23.64 | 40.74 |
| 20 Å Cr/20 Å DLC |  |  | 0 | 0 | 1.92 | 12.73 | 28.30 | 41.82 |
| 25 Å Ir/ 20 Å Cr/20 Å DLC |  |  | 0 | 0 | 0 | 0 | 1.82 | 9.09 |
| 25 Å Pt/20 Å Cr/20 Å DLC |  |  | 0 | 1.82 | 3.51 | 8.93 | 17.54 | 33.96 |
| 30 Å Ni/20 Å Cr/20 Å DLC |  |  | 0 | 5.56 | 17.02 | 41.51 | 100 |  |

As seen from table 2, all of the metallic layers tested (except Al) improved the lifetime of the peg by at least 144 times. Iridium produces the greatest increase in lifetime. Chromium, tin, and platinum were all comparable.

Example 3

Figure 6A:
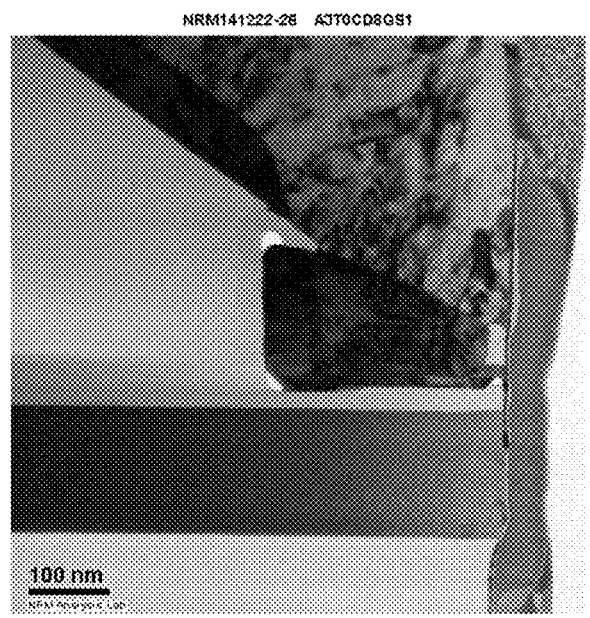
FIGS. 6A and 6B are TEM images of a heat assisted magnetic recording (HAMR) head that included a NFT having a gold peg and disc and a platinum (Pt) layer deposited thereon at 50,000× magnification (FIG. 6A) and 125,000× magnification (FIG. 6B).
Figure 6B:
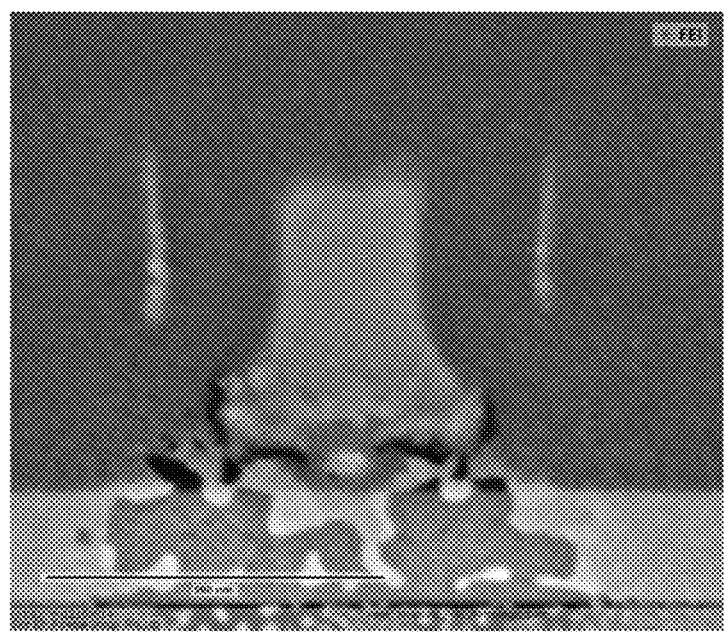

A 2 nm platinum layer was deposited on the ABS of a heat assisted magnetic recording (HAMR) head that included a NFT having a gold peg and disc. High laser power was coupled into the NFT through an input coupler. As seen in FIGS. 6A and 6B, the peg remains intact after the laser stress test. However, the sharp corners of the gold disc recessed and left behind voids. This indicates that the metallic layer on the peg improved the thermal stability thereof.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

As used herein, "about" or "approximately" shall generally mean within 20 percent, within 10 percent, or within 5 percent of a given value or range. "about" can also in some embodiments imply a range dictated by a means of measuring the value at issue. Other than in the examples, or where otherwise indicated, all numbers are to be understood as being modified in all instances by the term "about".

Thus, embodiments of devices including an overcoat layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
   a write pole;
   a near field transducer (NFT) comprising a peg and a disc, wherein the peg is at the ABS of the device;
   a metallic layer positioned over at least the peg of the NFT at the ABS, the metallic layer comprising: iridium (Ir), chromium (Cr), tin (Sn), platinum (Pt), or combinations thereof;
   an adhesion layer comprising silicon (Si), chromium (Cr), titanium (Ti), tantalum (Ta), zirconium (Zr), niobium (Nb), neodymium (Nd), hafnium (Hf), nickel (Ni), or combinations thereof; and
   an overcoat positioned over at least the metallic layer, wherein the adhesion layer is positioned between at least the metallic layer and the overcoat layer.

2. The device according to claim 1, wherein the wherein the metallic layer has a thickness from about 0.1 nm to about 50 nm.

3. The device according to claim 1, wherein the metallic layer is only overlying the peg.

4. The device according to claim 1 further comprising a magnetic reader and wherein the metallic layer is not positioned over the magnetic reader.

5. The device according to claim 1, wherein the adhesion layer has a thickness from about 0.1 nm to about 10 nm.

6. A device having an air bearing surface (ABS), the device comprising:
   a write pole;
   a near field transducer (NFT) comprising a peg and a disc, wherein the peg is at the ABS of the device;
   a metallic layer positioned over at least the peg of the NFT at the ABS and the write pole, the metallic layer comprising: iridium (Ir), rhodium (Rh), ruthenium (Ru), radium (Ra), platinum (Pt), palladium (Pd), rhenium (Re), chromium (Cr), niobium (Nb), nickel (Ni), lead (Pb), silicon (Si), tin (Sn), aluminum (Al), tungsten (W), molybdenum (Mo), hafnium (Hf), titanium (Ti), zirconium (Zr), yttrium (Y), or combinations thereof;
   an adhesion layer having a thickness from about 0.1 nm to about 10 nm; and
   an overcoat positioned over at least the metallic layer, wherein the adhesion layer is positioned between at least the metallic layer and the overcoat layer.

7. The device according to claim 6, wherein the metallic layer comprises iridium (Ir), chromium (Cr), tin (Sn), platinum (Pt), or combinations thereof.

* * * * *